Nov. 14, 1967  R. F. STEWART  3,353,021
APPARATUS AND PROCESS FOR CONTINUOUS MEASUREMENT OF MOISTURE
IN MOVING COAL BY NEUTRON THERMALIZATION
Filed Sept. 29, 1964

INVENTOR
ROBERT F. STEWART
BY Ernest S. Cohen
Gersten Sadowsky
ATTORNEYS

United States Patent Office 3,353,021
Patented Nov. 14, 1967

3,353,021
APPARATUS AND PROCESS FOR CONTINUOUS MEASUREMENT OF MOISTURE IN MOVING COAL BY NEUTRON THERMALIZATION
Robert F. Stewart, Morgantown, W. Va., assignor to the United States of America as represented by the Secretary of the Interior
Filed Sept. 29, 1964, Ser. No. 400,288
2 Claims. (Cl. 250—83.1)

ABSTRACT OF THE DISCLOSURE

Moisture content of coal measured by channeling a stream of coal around and past a flow guiding meter enclosure wherein a source of fast neutrons is set to direct its output to penetrate a predetermined thickness of the stream, and a thermal neutron detector responding to scattered back slowed neutrons to operate a scaler-recorder continuously indicating moisture content of the coal stream.

---

Figure 1:
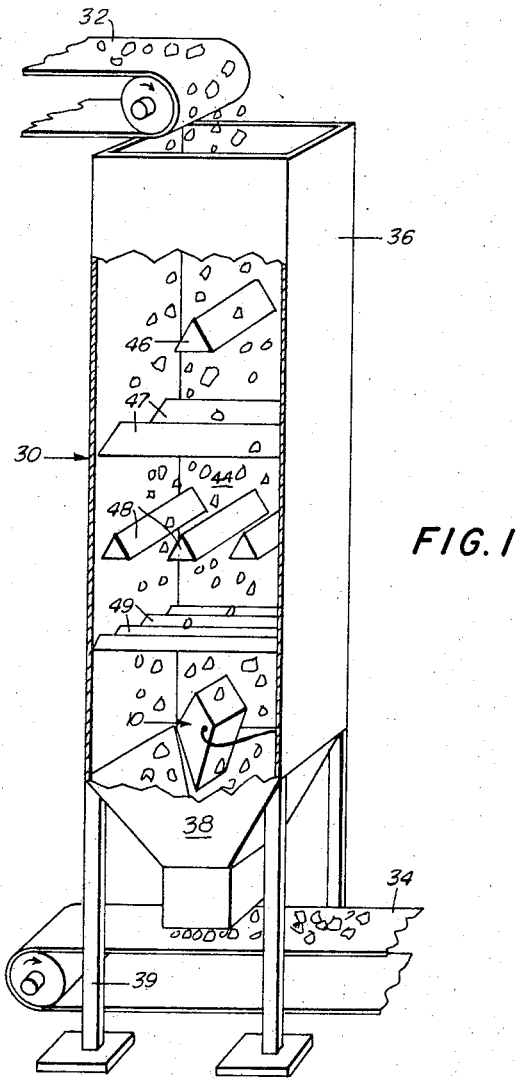

The present invention relates to an apparatus and process for the measurement of moisture contents in solid materials. More particularly, the invention makes available a continuous moisture analysis of a moving mass of material, such as coal, by penetrating such material with neutrons emitted from a source of fast neutrons and detecting, counting, and recording slowed, or thermalized neutrons reflected from the internal structure of the material.

Employment of the present invention to obtain data on the moisture content of coal makes possible significant economic benefits since such data is most often needed to achieve optimum utilization of large quantities of coal. For example, in the coke industry the moisture content in coal charged to coking ovens is of great importance in the making of uniform coke. Hence, an accurate, continuous method and means for controlling moisture in blending such coal charges would be highly advantageous to the coke industry. Moreover, the price of coal, as well as other economic and technical considerations involved in the effective use of coal depends, at least partly, on its moisture content. Heretofore, moisture measurements of coal were accomplished by relatively expensive and time-consuming sampling methods requiring size-reduction, and conventional laboratory analysis procedures. Determining moisture contents of large quantities of coal by applying such slow analytical techniques to selected samples of coal, rarely furnishes adequate data for the needs of modern coal technology. In contrast thereto, the present invention supplies uniformly accurate moisture measurement data produced instantaneously, continuously, and automatically.

Moisture in coal can be measured continuously from the thermalization of fast neutrons by hydrogen in the coal. Neutrons from a small source of fast neutrons are directed to penetrate the coal whereby the neutrons are scattered by hydrogen therein, and measured by a thermal neutron detector. Specifically, neutrons colliding with hydrogen atoms are attenuated, losing considerable energy such that their activity is slowed, whereas their collisions with heavy nuclei cause the neutrons to lose comparatively little energy. Moreover, the neutron scattering cross-section of hydrogen is large compared to most of the heavier elements. Thus an indication of the number of slow or thermalized neutrons reflected or scattered from a material exposed to a fast neutron source, effectively characterizes the number of hydrogen atoms present in the material. Coal contains a large amount of hydrogen in comparison to the hydrogen present in water, so that the hydrogen content of wet coal is slightly larger than that of dry coal. A numerical indication of the increase in thermalized neutrons from wet coal over that obtained from an equivalent dry coal is applicable to establish the content of hydrogen atoms combined in water constituting moisture in coal.

A further explanation of the principles underlying the present invention, and apparatus based thereon, are given in British patent specification No. 898,799, published June 14, 1962. This British patent discloses a fast neutron source operatively positioned, either above or below a moving bed of solid material containing little or no hydrogen, to transmit neutrons which either pass through or are reflected back from such bed of material so as to be sensed by a suitable thermal neutron detecting device. In the present invention, the neutron source and detector are effectively within the moving bed or layer of the solid material containing a large amount of hydrogen. Moreover the neutron source and detector are arranged to automatically compensate for variations in density so that the measurement is relatively independent of changes in density or particle size of the solid material.

It is therefore an object of the present invention to provide a reliable, non-destructive method and means for continuously measuring the moisture contents of a moving layer of solid material, independent of variations in density and particle size of the solid material.

Figure 2:
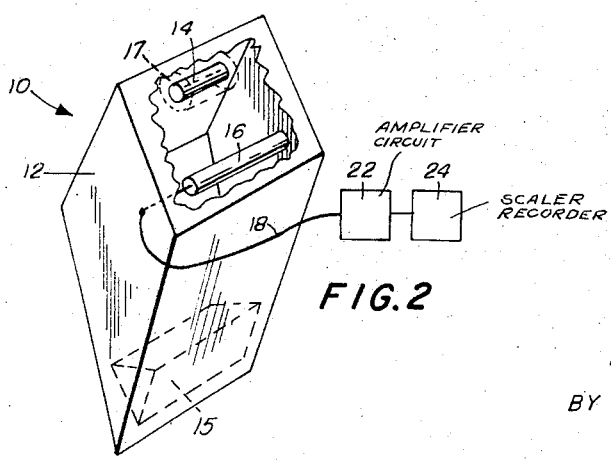

This and other objects of the present invention will be more clearly apparent from the following description of a preferred embodiment of the invention considered together with the accompanying drawing wherein:

FIG. 1 schematically illustrates structure adapting the moisture meter of the present invention for operation with a coal conveyor system; and FIG. 2 represents in elementary form a fragmentary showing of a moisture meter arrangement according to the present invention.

Reference to FIG. 1 shows the moisture meter 10 in a special purpose vertical housing 30, constituting a channel establishing a path for coal moving between an upper coal conveyor 32, and a lower coal conveyor 34. Conventional pivoted bucket carriers or continuous belt carriers of appropriate design can be used to provide conveyors 32 and 34. The square cross-section defined by its four outer panels 36, and its converging hopper structure 38, fashion housing 30 as an irregular duct-like passage, which as shown in FIG. 1, is supported on legs 39. Coal guided through the channel of housing 30, is supplied thereto from conveyor 32 by free fall, to pass through a blender apparatus 44, around moisture meter 10, and on to conveyor 34 by way of hopper 38.

Blender apparatus 44 comprises a series of divider elements including a deflector bar 46, and grates devices 47, 48 and 49 which are alternately arranged crisscrossed in the upper half of housing 30. The divider elements are in the path of coal moving through the channel of housing 30, wherein they act to split the coal into successive separate streams. In this way, coal which is inhomogeneous in composition or particle size when fed to housing 30 from conveyor 32, can be uniformly blended before meter 10 measures the moisture content of this coal as it moves out of the accumulation in the lower half of housing 30. As will be hereinafter more fully explained, moisture meter readings available during continuing operations of the apparatus shown in FIG. 1, at all times allow rapid discernment of any disparity between moisture existing in the coal and the moisture specified for such coal. Consequently, more or less quantities of moisture laden coal can readily be supplied to blender 44 as required to maintain a predetermined moisture content in the coal delivered to conveyor 34. Alternately, if conveyor 32 is feeding coal from a thermal dryer or other type processing equipment moisture meter readings relayed to the equipment would permit adjustment of drying rates to maintain the coal within specifications.

As shown in FIG. 2, moisture meter 10 comprises an arrangement in an enclosure 12, constituted by a neutron source 14, and a thermal neutron detector 16. A sturdy protective covering for the source and detector is provided by a closed double wedge-shape housing comprising enclosure 12, mounted in the channel of housing 30 by means of conventional support struts, or a spider structure, centrally locating the enclosure housing in the lower half of housing 30 underneath blender 44. In an exemplary arrangement, a single tube detector 16 is located approximately 6 inches from neutron source 14 to reduce the effect of variations in density of coal on the counting rate. It has been discovered that as the distance between the source and detector is increased the change in the number of neutrons measured, which is due to changes in density of the media rather than due to changes in moisture content, is reduced to a negligible value, such that with approximately 6 inches between source and detector, the readings obtained are relatively independent of variations in coal density and/or particle size. Thus with the configuration shown in FIG. 2, a change in density and/or particle size of the coal alters the effective volume of coal measured by the detector to compensate for the change in concentration of hydrogen resulting from the change in density and/or particle size. Essentially, the effect of this arrangement is to obtain measurements through larger volumes as the particle size increases so that to a large extent the moisture content of the coal can be measured independently of changes in density and/or particle size of the coal. This same objective may be obtained utilizing alternate physical arrangements of neutron source, detector in respect to one another and to the path of the measured coal, such as by providing different angles and shapes for the housing of enclosure 12. In addition to such possible alternate arrangements a similar effect can be obtained by various arrangements of filter materials 15 inside enclosure 12, such as wax bricks and cadmium plates arranged in the lower part of enclosure 12 to increase the number of neutrons scattered to the detector as a decrease in density of the surrounding coal reduces the number of neutrons reaching the detector. An electrical conductor 18, suitably connected to detector tube 16, provides a lead to outside housing 30 and is appropriately joined to an electronic amplifier circuit 22 operating a scaler-recorder 24.

Scaler-recorder 24 can be calibrated in an obvious manner to provide readings of moisture content directly in response to the number of thermalized neutrons sensed by detector 16. It is to be noted that fast neutrons emitted from source 14 are not recorded in the slow neutron detector until they have been slowed by collisions with hydrogen atoms in the coal moving around and past meter 10. Only those neutrons which have been moderated and elastically scattered by collision with hydrogen nuclei have a fair probability of producing a reaction in the neutron detector. The background radiation reading due to elastic collisions with carbon nuclei and hydrogen nuclei other than those in moisture is essentially a constant factor, and is continuously deducted from the total radiation recorded to ascertain data on moisture content.

Source 14 can supply fast neutrons from a radioactive isotope in a manner such as disclosed by the aforementioned Britisht patent. However, it is preferable to use a radioisotope source such as plutonium-beryllium or americium-beryllium since utilization of such source is accompanied by a constant output of neutrons for long periods of time and such sources are relatively cheap. The radiation output is set in each instance as required by the size or depth of the layer of coal surrounding the enclosure 12. Adjustments can be made to the fast neutron source by the use of filters 17 or different radioisotopes to cause the neutrons emitted to penetrate but not exceed a given thickness of coal, namely the least total thickness contemplated. Thus, continuous readings on the recorder 24 are always meaningful because irregularities in thickness beyond such total thickness do not affect the penetration, scattering and recording of slow neutrons. Exemplary of such energy considerations is the application of a 4 m.e.v. source of neutrons to act upon a ten inch surrounding layer of coal since the source will penetrate to a depth of about ten inches. It should be appreciated that a steady movement of the coal around and past meter enclosure 12 is necessary to measure a relatively large quantity of coal during a specific time period so that a representative value of moisture content may be gained at all times. The resolution time of the detector system including the neutron detector 16 and electronic circuit 22, is adjused to average the number of detected neutrons over a finite period, for example each 20 seconds, so that a constant average moisture content is recorded.

Emplacement of moisture meter 10 within the material under test, such that measurements are made relatively independent of changes in density as particle size, makes feasible the important advantages of the present invention. Furthermore, it is evident that the invention can be used to determine moisture content in other moisture containing materials such as in ores or minerals. Determinations regarding content may also be made of other hydrogen-containing materials such as methane in synthesis gas, hydrocarbons in ores, or gases, or hydrogen in helium. The invention may obviously also be used to determine hydrogen or moisture in materials moved by conveyor belts, pipelines, coal cars or trucks.

While preferred forms of the method and physical embodiment of the invention have been illustrated and described herein, it is understood that the invention is not limited thereby but is susceptible to changes in form and detail.

What is claimed is:

1. An apparatus for continuously measuring moisture in a stream of unhomogeneous, particled material containing relatively large amounts of hydrogeneous matter, comprising a housing having an inlet and an outlet and defining in between a channel wherein said particled material is guided to move as a mass, a substantially wedge-shaped enclosure and means supporting said enclosure centrally in said channel whereby extended edges of said enclosure are disposed across the path of said mass moving through said channel, a moisture meter comprising a radioactive means maintained centrally within said channel by a supporting attachment thereof within said enclosure, and radiating fast neutrons within an area of said moving mass of particled material, a thermal neutron detecting means attached within said enclosure for support at a predetermined distance from said radioactive means and operative thereby to detect thermal neutrons scattered back from said moving mass of particles, and an electronic circuit including a scaler operatively responsive to an output from said detecting means to control a recorder to indicate the moisture content of said material.

2. The moisture meter apparatus of claim 1 wherein a radiation filter affixed to said radioactive means modifies the penetration of the radiated fast neutrons into said moving mass of particles whereby the extent of said area of radiation in said mass of particles is determined in accordance with the radioactivity of said radioactive means and the modifying effect thereon by said filter.

References Cited
UNITED STATES PATENTS

| 2,873,377 | 2/1959 | McKay | 250—83.1 |
| 3,213,280 | 10/1965 | Burley et al. | 250—83.1 |

ARCHIE R. BORCHELT, *Primary Examiner.*